United States Patent
Vishlitzky et al.

[11] Patent Number: 6,047,353
[45] Date of Patent: *Apr. 4, 2000

[54] METHOD AND APPARATUS FOR MONITORING OF HOST ACTIVITIES RELATING TO AN ATTACHED STORAGE DEVICE

[75] Inventors: Natan Vishlitzky; Erez Ofer; Eli Shagam; David Shadmon, all of Brookline, Mass.

[73] Assignee: EMC Corporation, Hopkinton, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/822,388
[22] Filed: May 7, 1997
[51] Int. Cl.[7] ............................. G06F 12/00; G06F 13/00
[52] U.S. Cl. ........................... 711/111; 711/4; 711/112; 711/114
[58] Field of Search ................... 711/4, 111, 112, 711/114, 1, 113; 714/801, 805

[56] References Cited
U.S. PATENT DOCUMENTS

| | | |
|---|---|---|
| 5,089,958 | 2/1992 | Horton et al. ........................ 395/575 |
| 5,133,060 | 7/1992 | Weber et al. ........................ 395/425 |
| 5,619,644 | 4/1997 | Crockett et al. ................. 395/183.21 |
| 5,848,229 | 10/1992 | Morita ................................ 395/182.05 |

*Primary Examiner*—Tuan V. Thai
*Attorney, Agent, or Firm*—John M. Gunther; Krishnendu Gupta

[57] ABSTRACT

A method of providing synchronized operational information for a host computer and an attached storage system is provided. The method includes providing a trace buffer in a memory of the storage system. A special command is created which allows a host computer to write information to the provided trace buffer. The special command uses a command from the communication protocol command set is a specific way in order to effectuate the trace buffer entry. The trace buffer entry will have a time component based on the storage system time clock. Thus, host activity may be synchronized in time with the storage system activity. In addition to the trace buffer, a statistics table is provided which maintains a log of which applications programs running on specific hosts, accessed the devices of the storage system.

6 Claims, 5 Drawing Sheets

50 ⟶

| BYTES\BITS | BIT 7 | BIT 6 | BIT 5 | BIT 4 | BIT 3 | BIT 2 | BIT 1 | BIT 0 | |
|---|---|---|---|---|---|---|---|---|---|
| BYTE 0 | COMMAND CODE $3B | | | | | | | | ~ 51 |
| BYTE 1 | LOGICAL UNIT NUMBER | | | RESERVED | | MODE 'EMC'=01 | | | ~ 52 |
| BYTE 2 | | | GETHD | INL2 | EMC OPTION ID=$1D (1D EQUIVALENT) | | | | ~ 53 |
| BYTE 3 | EMC FEATURE CODE 04 | | | | | | | | ~ 54 |
| BYTES 4-5 | CHAIN CODE (AGAINST MISMATCH) | | | | | | | | ~ 55 |
| BYTES 6-8 | TRANSFER LENGTH | | | | | | | | ~ 56 |
| BYTE 9 | CONTROL BYTE | | | | | | | | ~ 57 |

| BYTES 0-2 | PASSWORD 'EMC' | ~ 61 |
|---|---|---|
| BYTE 3 | FEATURE NUMBER 04 | ~ 62 |
| BYTES 4-5 | CHAIN CODE | ~ 63 |
| BYTES 6-7 | EXTRA PARAMETERS LENGTH | ~ 64 |

| BYTE 0 | $17 (ORDER - EMC) | ~ 71 |
|---|---|---|
| BYTE 1 | $CE (VALIDITY CODE) | ~ 72 |
| BYTE 2 | 03 (SUB ORDER) | ~ 73 |
| BYTE 3 | 04 (SYSTEM CALL DATA) | ~ 74 |
| BYTES 4-7 | SYSTEM CALL NAME - 16 BIT CALL CODE | ~ 75 |
| BYTE 8 | FLAGS | ~ 76 |
| BYTE 9 | | |
| BYTES 10-11 | | |
| BYTES 12-13 | | |
| BYTES 14-15 | LENGTH OF EXTRA PARAMETERS IF FLAG SET | ~ 77 |
| BYTES 16-n | ACTIVE SYSTEM CALL BUFFER (32K MAX IN 8 BYTE MULTIPLES) | ~ 78 |

| BYTES\BITS | BIT 7 | BIT 6 | BIT 5 | BIT 4 | BIT 3 | BIT 2 | BIT 1 | BIT 0 | |
|---|---|---|---|---|---|---|---|---|---|
| BYTE 0 | COMMAND CODE $3C | | | | | | | | ~ 81 |
| BYTE 1 | LOGICAL UNIT NUMBER | | | RESERVED | | MODE 'EMC'=01 | | | ~ 82 |
| BYTE 2 | | | GETHD | INL2 | EMC OPTION ID=$1C (1C EQUIVALENT) | | | | ~ 83 |
| BYTE 3 | EMC FEATURE CODE 04 | | | | | | | | ~ 84 |
| BYTES 4-5 | CHAIN CODE (AGAINST MISMATCH) | | | | | | | | ~ 85 |
| BYTES 6-8 | TRANSFER LENGTH | | | | | | | | ~ 86 |
| BYTE 9 | CONTROL BYTE | | | | | | | | ~ 87 |

| BYTE 0 | RETURN CODE | ~ 91 |
|---|---|---|
| BYTES 1-2 | RETURN CODE MODIFIER | ~ 92 |
| BYTE 3 | FEATURE NUMBER 04 | ~ 93 |
| BYTES 4-5 | CHAIN CODE | ~ 94 |
| BYTES 6-7 | EXTRA DATA LENGTH | ~ 95 |

| BYTE 0 | $17    (ORDER - EMC) | ~101 |
|---|---|---|
| BYTE 1 | RETURN CODE (00 INDICATES NO ERRORS) | ~102 |
| BYTE 2 | SYSTEM CALL CODE | ~103 |
| BYTES 4-n | RETURN DATA | ~104 |

FIG. 6C

METHOD AND APPARATUS FOR MONITORING OF HOST ACTIVITIES RELATING TO AN ATTACHED STORAGE DEVICE

BACKGROUND OF THE INVENTION

This invention relates generally to storage systems associated with computer systems and more particularly to providing a method and apparatus for monitoring host initiated events which are related to a particular storage system.

As it is known in the art, computer systems generally include a central processing unit, a memory subsystem and a storage subsystem. According to a networked or enterprise model of a computer system, the storage subsystem associated with or in addition to a local computer system, may include a large number of independent storage devices or disks housed in a single enclosure. This array of storage devices is typically connected to several computers (or hosts) via dedicated cabling or via a network. Such a model allows for the centralization of data which is to be shared among many users and also allows a single point of maintenance for the storage functions associated with the many computer systems.

One type of storage system known in the art is one which includes a number of disk storage devices configured as an array (sometimes referred to as RAID). Such a system may include several arrays of storage devices. In addition to the arrays of storage devices, typical storage systems include several types of controllers for controlling the various aspects of the data transfers associated with the storage system. One type of controller is a host controller and provides the interface between the host computers and the storage system. Another type of controller is a disk controller. There may be one or more disk controllers for each array of storage devices in a storage system. The disk controller manages the transfer of data to and from its associated array drives.

In addition to the controllers described above, advanced storage systems, such as the SYMMETRIX® storage systems manufactured by EMC Corporation, may include a very large memory which is coupled to each of the controllers in the system. The memory may be used as a staging area (or cache) for the data transfers between the storage devices and the host computers and may provide a communications path between the various controllers. Such systems provide superior performance to non-cache storage systems. The price paid for this superior performance is complexity. Since there may be many controllers and storage devices in a system, with data moving between several controllers of the system, there is the potential for operational errors which may be difficult to diagnose.

In order to properly diagnose a problem reported by a user of the above described storage system, it would be helpful to the person performing the diagnosis to be able to examine the events which preceded the problem. However, present storage systems are unable to provide a host user with a history of host initiated events and their corresponding storage system resultant events. Thus a specialized diagnostic procedure would typically be needed to pinpoint any system failures.

The specialized diagnostic procedure might require a site visit by the service personnel so that they could access information about the storage system from a service computer connected directly to the storage system. The information gathered might be a trace record of the events which occurred over a certain period of time within the storage system. However in order to be useful, this information would need to be correlated with any events which occurred at the host computer. Unfortunately host trace information (if any exists at all) is typically routed to a host display or host log file.

Until now, there has been no way to interleave and log the host events with their corresponding storage system events. Before the present invention there would be two separate histories on two different machines. Since the clock resolutions of the host and storage system may be different, the time stamp information associated with each trace file is not easily correlated. The service personnel is thus faced with the formidable task of trying to correlate the information stored in the individual files. It would be advantageous therefore to provide a means for allowing the host computers connected to a storage system to track the history of events initiated by the host along with the resultant events occurring on the storage system.

SUMMARY OF THE INVENTION

In accordance with the present invention, a host initiated trace facility is provided which allows a user of a host computer or an application running on the host computer which is connected to a storage system to enable and review the recording of an event history associated with the operation of the storage system. The facility includes providing a trace buffer within a globally accessible memory within the storage system. The trace buffer includes a table for each logical device in the storage system. During normal operation or if a host suspects that the storage system is not operating properly, the host computer may issue a so called host-trace command to the storage system. The host trace command may be issued using the SCSI write buffer command which has been built by the host. The storage system will, in response to receipt of the host trace command, insert records into the trace buffer. The records inserted include, among other things, fields for recording the identity of the application on the host which issued the command, the time at which the command was issued, and the number of times a particular host accessed the device. Later, the host may read the information stored in the trace buffer tables in order to determine if the record of device accesses matched the actual number of accesses performed by the host application. Other uses of the trace information are also envisioned such as debugging operational source code within a storage system or tracking the behavior of a storage system in relation to activities occurring on an attached host computer.

BRIEF DESCRIPTION OF THE DRAWINGS

The above and further advantages of the present invention may be better understood by referring to the following description taken into conjunction with the accompanying drawings in which:

FIGS. 5A–5C are illustrations of a SCSI read buffer command as used according to a preferred embodiment of the present invention in order to implement the host trace facility.

FIGS. 6A–6C are illustrations of a SCSI write buffer command as used according to a preferred embodiment of the present invention in order to implement the host trace facility.

DETAILED DESCRIPTION OF THE PREFERRED EMBODIMENT

Figure 1:
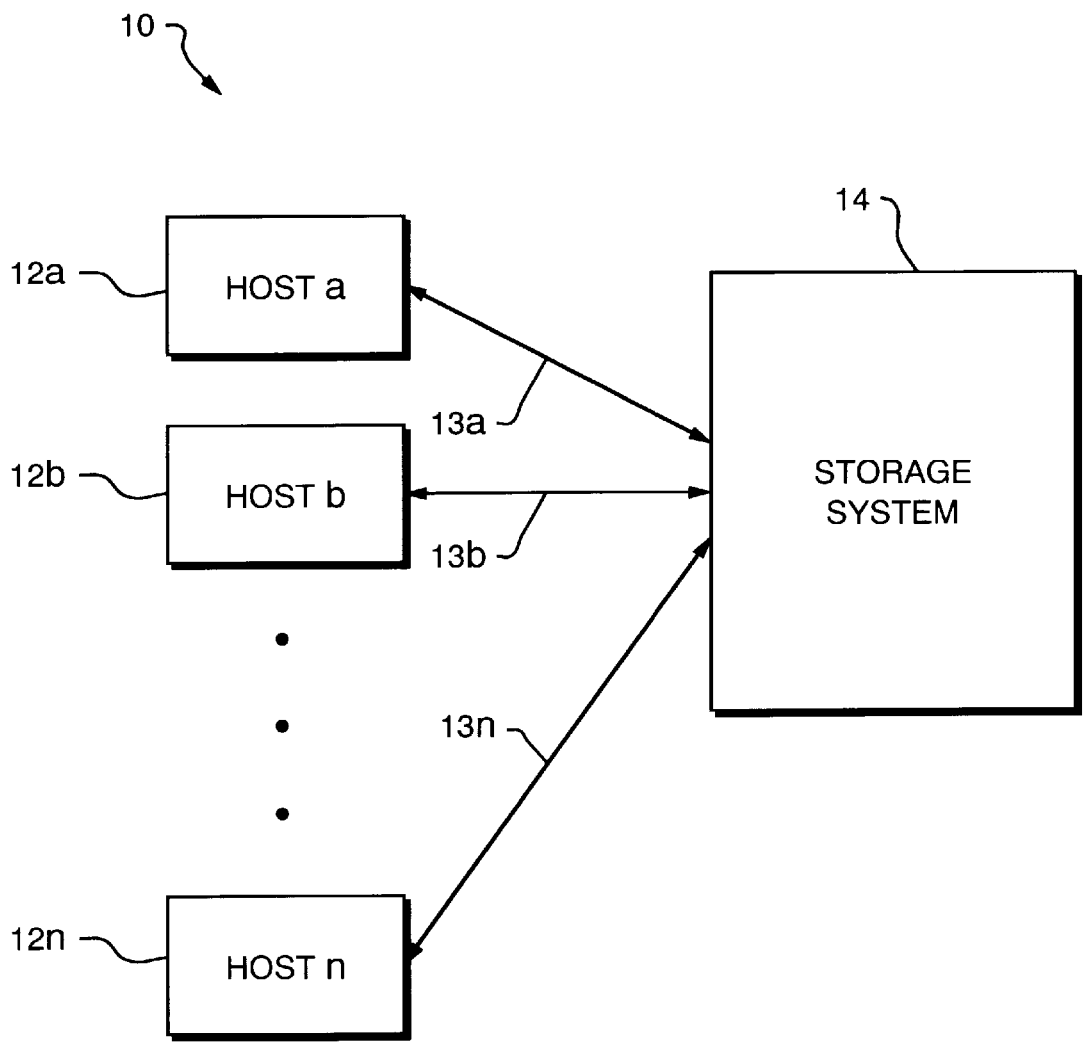
FIG. 1 is a block diagram of a computer system including a mass storage system incorporating the present invention.

Referring now to FIG. 1, computer system 10 is shown to include, among other things, a plurality of host computers 12a–12n, coupled to a storage system 14 via communication paths or busses 13a–13n respectively. The host computers may each be any of a well-known type of computer system. For example, host 12a may be a mainframe computer or may be an open-systems computer or alternatively may be a personal computer. Since each of the computer systems just mentioned typically communicates using a specific communication protocol buses 13a–13n will correspondingly be those buses specific to the computer system to which they are coupled. That is for example, assuming host 12b is an open-systems type computer system (e.g. running the UNIX Operating System) bus or communication path 13b would typically be a SCSI type communications path or a fibre-channel communications path. All communications over bus 13b would therefore adhere to the SCSI or fibre-channel communications protocol respectively.

Figure 2:
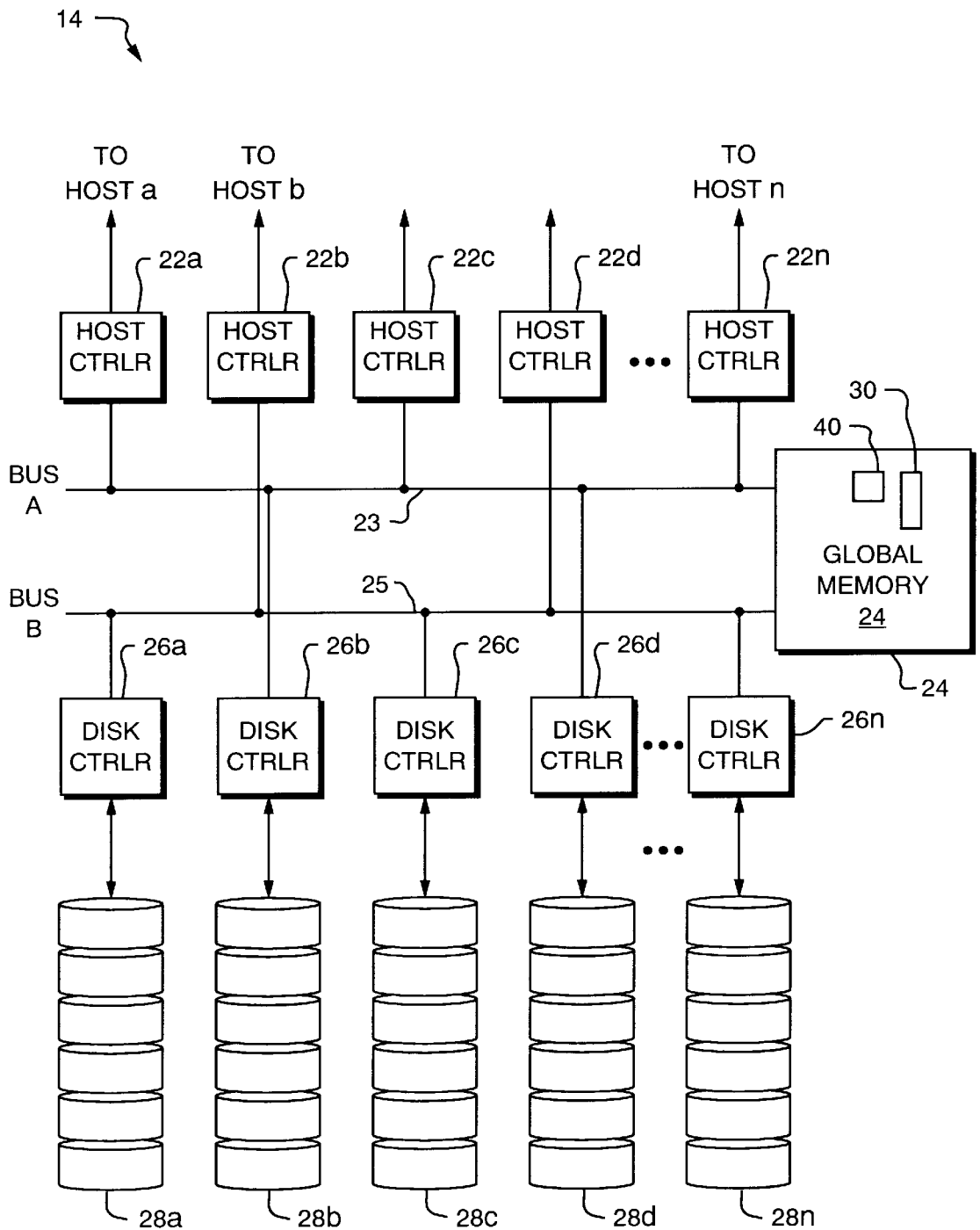
FIG. 2 is a diagrammatic representation of the storage system of FIG. 1

The storage system 14 of computer system 10 may be a mass storage system which, as will be described in more detail below, includes several individual components coupled via an internal communications path. The communications path may include one or more buses. Referring now to FIG. 2 the storage system 14 of FIG. 1 is shown in more detail. Here the storage system includes a plurality of host controllers 22a–22n which are, according to a preferred embodiment of the present invention, coupled alternately to buses 23 and 25. Each host controller 22a–22n is responsible for managing the communication between its associated attached host computer and storage system 14. Also coupled alternately to buses 23 and 25 are a plurality of disk controllers 26A–26n. Coupled to each disk controller is an array of storage devices which as shown here may be magnetic disk devices. As with the host controllers described above, each disk controller is responsible for managing the communications between its associated array of disk drives and the host controllers or memory 24 of storage system 14.

Also coupled to both buses 23 and 25 is global memory 24. According to a preferred embodiment of the present invention, global memory 24 serves as a very large cache which is used during the transfer of data between the host computers and the disks of disk arrays 28a–28n. During operation, a host may desire to read data from or write data to one of the disk arrays contained within the storage system 14. In order to do so, the host computer would send a request over its associated bus (for example bus 13a) to the controller attached to that bus (here controller 22a). The controller, once it receives the request from the host computer, then begins performing those tasks necessary to satisfy the request from the host. For example, if the request by the host was to write some portion of data to one of the disks in any of disk arrays 28a–28n, the host controller receiving the request would begin writing the data received from the host to the global memory 24. Once all of the data was written to global memory 24, the host controller may send an acknowledge signal back to the host computer indicating that the data was received. Sometime thereafter one of the disk controllers 26a–26n, depending on the target disk array, will begin reading the data from the global memory and writing it to the associated target disk device. Alternately, if the request received from the host computer was to read data from one of the disk arrays 28a–28n, thre host controller would first look to the global memory 24 to determine if the data was already resident in the global memory (as may be the case if a previous read was performed for the same data). If the data is resident in the global memory, this would be known as a cache hit and the host controller would begin reading the data from the global memory and delivering it to the host. On the other hand, if the data was not resident in global memory, this would be considered a cache miss and the associated disk controller would then begin reading the data from the corresponding disk device of the host request. The data read would be placed into the global memory 24. The host controller would then read the data from the global memory 24 and deliver it to the requesting host device.

As shown in FIG. 2, there may be several host controllers included within the storage system 14. Each of those host controllers may, according to a preferred embodiment of the present invention, be coupled to a different host computer. Each of the host computers may act independently and thus several computers may be requesting reads and writes of data in storage system 14 at any given time. In order to balance the demands of all the computers connected to storage system 14, each of the host controllers and disk controllers include a complex combination of hardware and software which communicate over buses 23 and 25 with global memory 24 in order to provide an efficient and reliable storage system. Since storage system 14 is such a complex system, when an error does arise in the system, identifying the cause of the error is typically a formidable task.

According to a preferred embodiment of the present invention, one method employed to attempt to identify errors within the storage system is to provide a trace buffer, here shown as buffer 30, within global memory 24, which may keep a record of every transaction which transpired within the storage system over a given period of time. With such a trace buffer, a field service engineer may be able to determine where an error is occurring within a storage system 14. However, until the present invention, there has been no efficient way to determine what activities had transpired on the host computers which gave rise to the errors as may be identified in trace buffer 30.

Although the host computers may have the capability of tracing their own activities, their trace buffers were typically stored locally to the computer themselves and thus it became the job of the field service engineer to try to correlate two separate trace buffers in order to determine what might have caused an error within the storage system. With many hosts acting independently, this becomes an almost impossible task. Furthermore, in some instances, because of security reasons, the host information is not available at all to the field service engineer.

According to the present invention, a utility is provided which allows a host computer attached to storage system 14 to insert data into the trace buffer 30 resident in global memory 24. By providing support for such a utility within storage system 14, the task of debugging errors or analyzing storage system events which relate to host events is greatly reduced.

One of the features of the present invention is the ability to use standard commands which are supported by the communication protocols of the host computers connected to storage system 14. The standard commands are here used to create a new command which is not part of the command set of the communications protocols of the host computers connected to storage system 14. That is for example, the SCSI communication protocol has no command in its command set which causes a storage system to write a piece of data directly to a buffer within the global memory. As such, according to one embodiment of the present invention, the SCSI write buffer and read buffer command pair is modified to effectuate the storage of host activity information within buffer 30 of storage system 14.

Figures 3, 4:
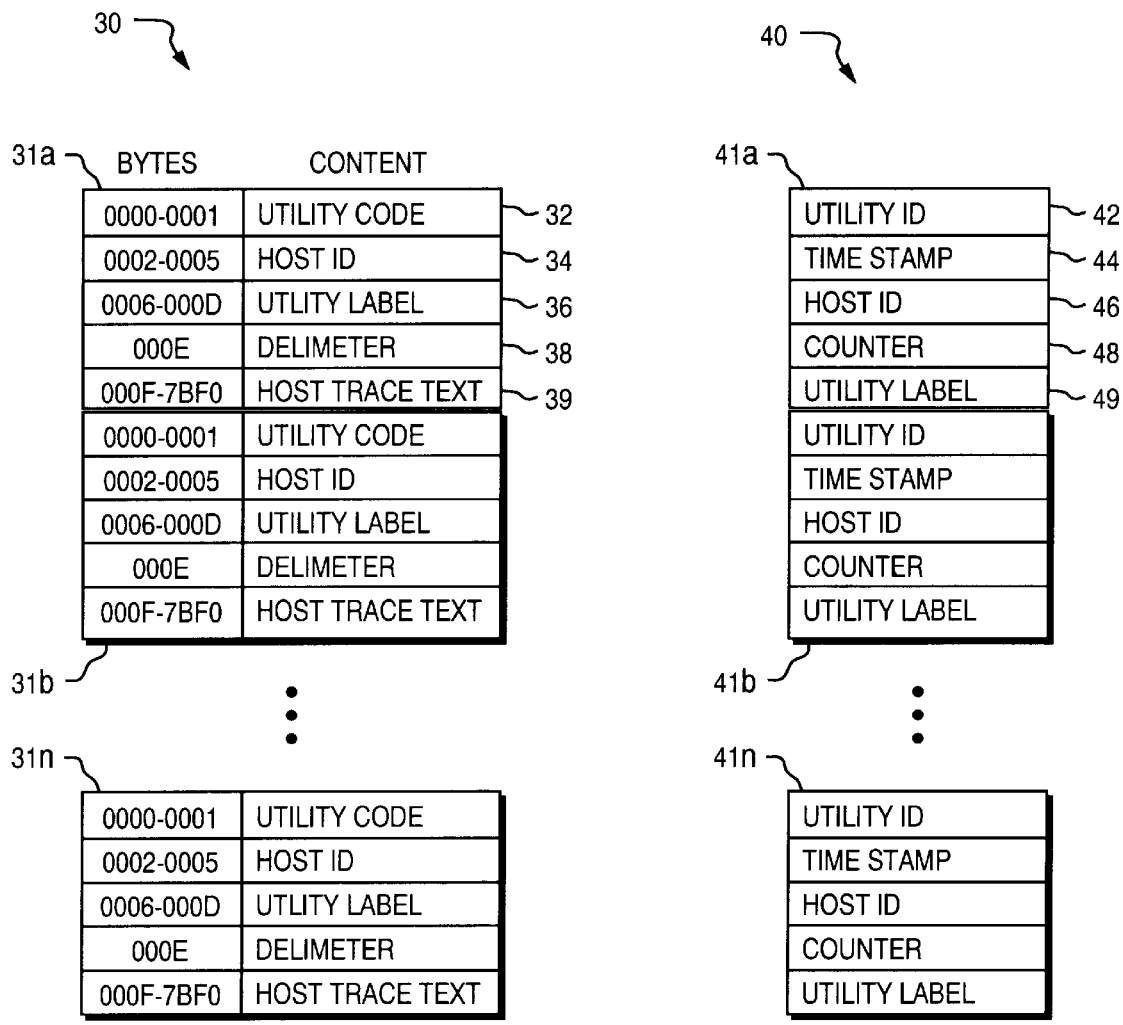
FIG. 3 is an illustration of a host trace buffer stored in the memory of the storage system of FIG. 2.
FIG. 4 is an illustration of one statistics device table which may be stored in the memory of the storage system of FIG. 2.

Referring now to FIG. 3, the host trace buffer 30 of FIG. 2 is shown in more detail. Host trace buffer 30 includes a plurality of host trace records 31*a*–31*n*. Each record, as in for example record 31*a*, includes an entry field 32 for storing a utility code identifier, a field 34 for storing a host identification, a field 36 for storing a utility label, a field 38 for storing a hard coded delimiter, and field 39 for storing optionally provided host trace text. Each time a host issues a host trace command (as will be described in more detail below) a record like those that are shown in records 31*a*–31*n* will be added to the host trace buffer 30. As illustrated in record 31*a*, the utility code of field 32 is preferably stored in bytes zero and one of 31*a*. The utility code is here used to store an identification of the application program which issued the host trace command. Entry 34 of record 31*a* is here shown as being stored in bytes 2 through 5 and includes a host identification which is used to identify the host computer running the application program which issued the host trace command. Entry 36 of record 31*a* is here shown as being stored in bytes 6 through D (hex) may be used by the application program issuing the host trace command to provide an ASCII text string to label the host trace record. Entry 38 is a hard-coded symbol stored in byte E (hex) of record 31*a*. Here the delimiter is a semi-colon but maybe any delimiter useful to either the application program or the storage system. Lastly, each record 31 of the host trace buffer may include text as supplied from the host application program. Each record provides approximately 31K bytes of storage in entry 39 of each record. Using entry 39, the host may provide text which identifies, for example, where in the application program execution is occurring. The host may also provide any other text which may be useful in debugging a potential problem between the host computer and the storage system.

In addition to host trace buffer 30, and in accordance with the present invention, a statistics table 40 is maintained for each device of storage system 14. Each statistics table will preferably include a plurality of records, here shown as records 41*a*–41*n* and will include information about the last several utilities (i.e. application programs) which accessed a particular device. As shown each record, for example 41*a*, includes a number of entries 42, 44, 46, 48 and 49 which are used to identify and track the utility access of a particular device. Here entry 42 (utility identification) is used to store the identification of the host application program which issued the host trace command and accessed a particular device. Entry 44 is used to store a time stamp based on the storage system clock and indicates when in time the particular utility accessed the device (i.e. issued the host trace command). Entry 46 is here used to store an identification of a particular host computer which issued the host trace command. Entry 48 is a counter which is used to keep track of the number of times the host identified in entry 46 accessed the device associated with statistics table 40 using the utility identified in entry 42.

An entry is made into the statistics table 40 as described below. When the host controller receives a host trace command from an associated host computer, it will extract the relevant information such as utility ID, host ID, and the device ID from the host trace command data. The controller will then use that information when accessing device table 40. The controller will look to table 40 to see if there are currently any entries in statistics table 40 which match the utility ID and host ID of the current host trace command. If there is a match, the counter value of the matching record will be updated. In addition, the time stamp entry 44 will be rewritten with the current time. If there is no match in the statistics table for the current host trace command data, the controller will insert a new record for example record 41*b* into the statistics table 40.

If all records are occupied with data and no match has been found between the current host trace command and an existing record, the controller will replace the record having the oldest time stamp value in its time stamp entry 44. Thus, at any given moment where the number of records in statistics device table 40 is equal to n the last n utilities that accessed the associated device and the times associated with those accesses may be examined.

Referring now to FIGS. 5A–5C and according to a preferred embodiment of the present invention, the issuance of a host trace command using a SCSI write buffer command will now be discussed. Referring first to FIG. 5A, the first portion or first transmitted part of a SCSI write buffer command is shown in command block 50. Command block 50 includes ten bytes of data which is here segmented into seven discrete portions 51 through 57. The first entry 51 in command block 50 at byte 0, is the command code $3B. This command code, when interpreted by the host controller of storage system 14 will be used to indicate that a write buffer command is to be executed. Other information included in command block 50 is entry 51 or byte 1 which includes, at bit locations 7–5 a logical unit number which is used to identify a particular logical storage device within storage system 14. Other entries interesting for the preferred embodiment of the present invention are entry 54 or byte 3 which identifies this particular write buffer command as being one of a special set of write buffer commands for use by storage system 14 to accomplish a non-SCSI defined task (e.g. write to global memory). Entry 55 which includes bytes 4 and 5 stores a chain code or a serial number value which is used to synchronize the command block 50 with the other write buffer blocks 60 and 70 transmitted during a different bus cycle than command block 50.

Command block 50 is built by the host application and transmitted to the storage system 14 over the appropriate bus to be received by the host controller. Here the appropriate bus would be a bus adhering to the SCSI protocol and the host controller would be one which would be optimized for receiving and processing SCSI commands. According to the SCSI protocol, the host would first build and send command block 50 and transmit it to the relevant host controller of storage system 14 during a first bus cycle. Then in another bus cycle the host would send a parameter header associated with a write buffer command as shown in header 60 of FIG. 5B. Additionally, in the second bus cycle the host would send the body of the write buffer command 70 here illustrated in FIG. 5C.

Referring to FIG. 5B, header 60 of a write buffer command includes four entries here stored as eight bytes of data. Entry 61 and 62 which includes bytes 0–3 are used to store a password at bytes 0–2 and a feature number at byte 3. These entries are used to identify a storage system specific command such as the host trace utility command. Entry 63 (bytes 4 and 5) are here used to store a chain code which should match the chain code stored in entry 55 of the command block 50 (FIG. 5A). Entry 64 (bytes 6–7) is used to indicate the length of data that will be passed with the write buffer command during the body transmission portion of the write buffer command.

Referring now to FIG. 5C, the body of a write buffer command according to the SCSI protocol is shown to include a plurality of entries used to effectuate the host trace utility of the present invention. Here entries 71, 72, 73 and 74 which are stored in bytes 0 through 3 are used to store specific storage system identifiers which indicate to the receiving controller that the command is a special system call. The controller uses this information to determine that the command is being used to perform some other function than a typical read or write of data as normally done with storage devices as shown in FIG. 2. Entry 75 (bytes 4–7) specifically identifies the particular system call being executed using the SCSI write buffer command. Here the identification stored in entry 75 indicates the host trace command. Thus when the body is received by the controller, the controller may examine bytes 4–7 and know that a host trace command utility is to be executed. Entry 76 (byte 8) is here used to store various flags indicating how data is to be checked for errors and the format of the data as being ASCII or binary. Additionally a flag in byte 8 may be used to indicate that data beyond the traditional 16 bytes of data is to be transmitted. Entry 77 (bytes 14 and 15) may include, if the appropriate bit is set in byte 8, the length of the additional bytes of data which would be stored in entry 78. As shown entry 78 includes bytes 16-n and may span up to 31 kilobytes of data. The data is typically in 8 byte multiples. For the host trace utility command of the present invention, bytes 16-n would include that data necessary to fill host trace buffer 30 as shown in FIG. 3. Thus, when receiving the write buffer command, the host controller will look to the various entries in the write buffer command block as well as the header and body portions of the write buffer command and determine that a specialized storage system specific system call should be executed. After identifying the specific system call to be executed as indicated in entry 75, the controller receiving the command would take the data as stored in entry 78 and use that to fill the host trace buffer 30.

According to the SCSI protocol, the write buffer command is actually executed as a write buffer,/read buffer pair. The read buffer portion of the cycle is used to verify that the command actually executed as expected. Referring now to FIGS. 6A–6C a SCSI read buffer command as used in the preferred embodiment of the present invention is shown to include three discrete sections. Referring first to FIG. 6A, command block 80 shown as being similar in structure and content to command block 50 of FIG. 5A. The difference is that the command code at byte zero and the option ID at byte 2 are different to indicate that the command is a read buffer command. The read buffer header 90 as shown in FIG. 6B includes information to be returned to the host which issued the write buffer portion of the read/write pair. Here, byte zero includes a return code which, according to a preferred embodiment of the present invention, will be set to the value zero if the write portion of the command executed successfully. Other entries in header 90 are similar to the entries described for header 60 of FIG. 5B. For example here at bytes 4 and 5 the chain code is used to synchronize the various transmissions which make up a single command.

Referring now to FIG. 6C, the body of a read buffer command is shown to include several entries. The most important of which is entry 102 (byte 1) which should be, according to the preferred embodiment, set to the value zero if the command executed properly. A value other than zero returned in the body portion of a read buffer command would indicate that the write buffer portion of the command did not execute properly.

Although the host trace utility of the present invention was described as being implemented using the SCSI communications protocol, it should be understood that other communication protocols supported by storage system 14 of FIG. 2 may also be used in specific ways to enable the host-trace facility. The advantage of the present invention lies in the storage system being responsive to a host driven command in order to insert host activity information into storage system global memory.

Thus for example, a mainframe host computer may build a similar command block and transmit it to the specific mainframe host controller which would interpret the sent data and effectuate the storage of the host trace information in host trace buffer 30. Similarly, a personal computer connected to storage system 14 may be used to send the appropriate information to a host controller causing the host controller to execute a host trace utility and thus insert host information as described previously into the host trace buffer 30. Additionally, each of the mainframe and personal computer specified commands would also cause the receiving controller to make entries into the statistics table 40 as described previously with reference to FIG. 4. Thus the host trace utility is not limited to a particular host computer and may be used as a synchronized trace between both all host computers and the storage devices of storage system 14.

Having described a preferred embodiment of the present invention, it will now become apparent to those of skill in the art that other embodiments incorporating its concepts may be provided. It is felt therefore that this invention should not be limited to the disclosed embodiment but rather should be limited only by the spirit and scope of the appended claims.

What is claimed is:

1. A storage system comprising:
    a memory;
    a plurality of storage devices coupled to a disk controller which is further coupled to said memory;
    a host trace buffer disposed within said memory;
    a device statistics table disposed within said memory; and
    a host controller coupled to said memory and serving as a communications interface between a host computer and said storage system, said host controller responsive to a host trace command for recording, in said host trace buffer, information about said host, said host controller further responsive to said host trace command and for recording, in said device statistics table, statistics information pertinent to issuance of said host trace command, said device statistics table includes a plurality of sub-tables where each sub-table corresponds to one of said plurality of storage devices and includes a plurality of records and where each record comprises a utility identification entry for identifying an application program running on said host computer which issued said host trace command, a time stamp entry corresponding to the time when said host trace command was issued to a particular device associated with said record, and a host identification corresponding to said identity of said host computer which issued said host trace command.

2. The storage system of claim 1 wherein said host trace buffer includes a plurality of records and where each record includes a plurality of entries for storing an identity of an application program running on said host computer which issued said host trace command, an identity of said host computer, and trace information from said host.

3. The storage system of claim 1 wherein said each of said plurality of records further comprises a counter entry corresponding to the number of times said host trace utility was issued for by said application program to said particular device associated with said record.

4. In a storage system having at least one host interface controller, a memory, and a plurality of storage devices, a method of providing synchronized operational information between said storage system and a host computer coupled thereto comprising the steps of:

receiving a host trace command from said host computer;

in response to receipt of a host trace command, recording in said memory, an identity of an application program which issued said host trace command, an identity of said host computer on which said application program is running, a time stamp indicating a time, as measured by said storage system, at which said host trace command was issued, and a counter indicating a number of times said application program issued said host trace command;

providing a host trace buffer, wherein said identification of said application program and said identification of said host computer are recorded in said host trace buffer; and providing a plurality of device statistic tables where each one of said tables corresponds to one of said plurality of storage devices.

5. The method as in claim 4 wherein said recording step further includes the steps of:

determining from said host trace command, a target device associated with said host trace command, determining whether a device statistics table entry exists for said target device;

if no entry exists for said target device, storing in said device statistics table associated with said target device, said identification of said application program, said identification of said host computer, said time stamp, and an initial counter value;

if a device statistics table entry does exist for said target device, updating said time stamp with a current time value as measured by said storage system and incrementing said counter value.

6. The method as in claim 5 wherein said step of determining whether a device statistics table entry exists for said target device includes the steps of:

comparing identification of said host computer information corresponding to said host trace command with associated entries in said device statistics table for said target device;

comparing said identification of said application program information corrresponding to said host trace command with associated entries in said device statistics table for said target device.

* * * * *